(12) United States Patent
Lyall, III et al.

(10) Patent No.: US 6,663,145 B1
(45) Date of Patent: Dec. 16, 2003

(54) CONDUIT COUPLING WITH INTERIOR GRIP RINGS

(75) Inventors: Lucian H. Lyall, III, Coto De Caza, CA (US); Stephen J. Boros, Corinth, TX (US); James A. Inhofe, Jr., Sapulpa, OK (US)

(73) Assignee: Group Timberline, Inc., Corinth, TX (US)

( * ) Notice: Subject to any disclaimer, the term of this patent is extended or adjusted under 35 U.S.C. 154(b) by 0 days.

(21) Appl. No.: 09/991,830

(22) Filed: Nov. 5, 2001

Related U.S. Application Data

(60) Provisional application No. 60/246,322, filed on Nov. 6, 2000.

(51) Int. Cl.[7] .......................... F16L 17/00; F16L 19/06; F16L 19/08
(52) U.S. Cl. ..................... 285/340; 285/104; 285/313; 285/321; 285/417
(58) Field of Search ................................ 285/313, 921, 285/104, 105, 340, 369, 417, 321

(56) References Cited

U.S. PATENT DOCUMENTS

| | | |
|---|---|---|
| 1,065,387 A | 6/1913 | Ogg |
| 1,762,766 A | 6/1930 | Garay |
| 2,580,818 A | 1/1952 | Mundy et al. |
| 3,874,709 A * | 4/1975 | MacDonald ................. 285/104 |
| 3,984,132 A | 10/1976 | Sarson |
| 4,030,742 A | 6/1977 | Eidelberg et al. |
| 4,054,305 A | 10/1977 | Gajajive et al. |
| 4,079,966 A | 3/1978 | Berry et al. |
| 4,181,329 A * | 1/1980 | Helm ............................ 285/3 |
| 4,547,004 A | 10/1985 | Goldberg |
| 4,674,775 A | 6/1987 | Tajima et al. |
| 4,770,560 A | 9/1988 | Ott |
| 5,169,179 A | 12/1992 | Teel, Sr. et al. |
| 5,215,336 A | 6/1993 | Worthing |
| 5,405,340 A | 4/1995 | Fageol et al. |
| 5,439,258 A | 8/1995 | Yates |
| 5,439,259 A | 8/1995 | Taga et al. |
| 5,519,273 A | 5/1996 | Keck |
| 5,520,419 A | 5/1996 | DeBoalt et al. |
| 5,553,901 A * | 9/1996 | Serot .......................... 285/322 |
| 5,562,313 A | 10/1996 | Piniaev et al. |
| 5,562,482 A | 10/1996 | Wright |
| 5,709,417 A | 1/1998 | Verbeck |
| 5,722,702 A * | 3/1998 | Washburn .................... 285/322 |
| 5,911,446 A * | 6/1999 | McLennan et al. ......... 285/104 |
| 6,059,321 A | 5/2000 | Lyall, III |
| 6,170,884 B1 * | 1/2001 | McLennan et al. ......... 285/112 |
| 6,231,090 B1 * | 5/2001 | Fukao et al. ................ 285/340 |

FOREIGN PATENT DOCUMENTS

| | | | | |
|---|---|---|---|---|
| EP | WO 93/02315 | * | 3/1993 | |
| FR | 2683017 A1 | * | 4/1993 | ................. 285/340 |
| GB | 2155576 A | * | 9/1985 | |
| JP | 206196 | * | 8/1989 | ................. 285/340 |
| JP | 404107384 A | * | 4/1992 | ................. 285/340 |

* cited by examiner

Primary Examiner—Lynne H. Browne
Assistant Examiner—Aaron Dunwoody
(74) Attorney, Agent, or Firm—Mark W. Handley; Chauza & Handley, L.L.P.

(57) ABSTRACT

A grip coupling (18) for tubular conduit has a coupling body (20) formed by two halves (22, 24) which are joined along weld lines (26). The two halves (22, 24) each include a tapered entrance section (28) and an interior seal (30). The interior seals (30) are disposed inboard of the tapered entrance sections (28). Two annular-shaped shoulders (32) are formed in the interior surfaces of each of the two halves (22, 24), and are spaced apart to face inboard relative to the respective two halves (22, 24) when the two halves (22, 24) are joined together. Two grip rings (36) are disposed within respective ones of the two halves (22, 24), fitting against respective ones of the two annular-shaped shoulders (32). The grip rings (36) have grip teeth (40) and are tapered to extend radially inward in an inboard direction relative to the body (20).

13 Claims, 6 Drawing Sheets

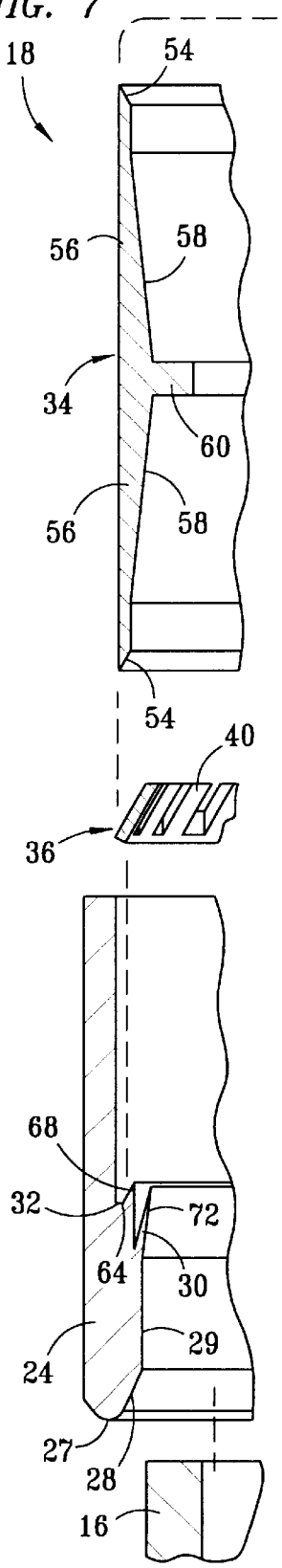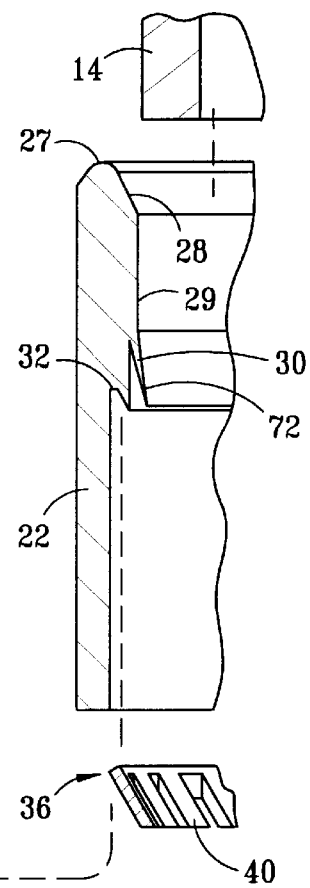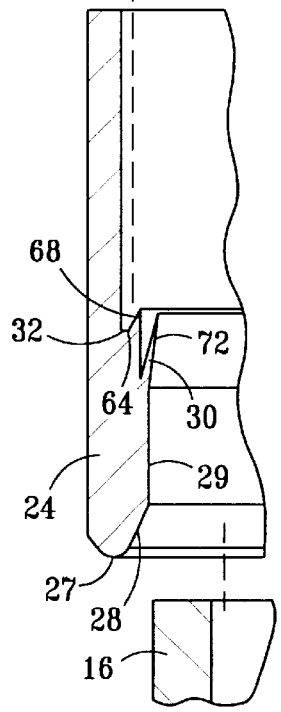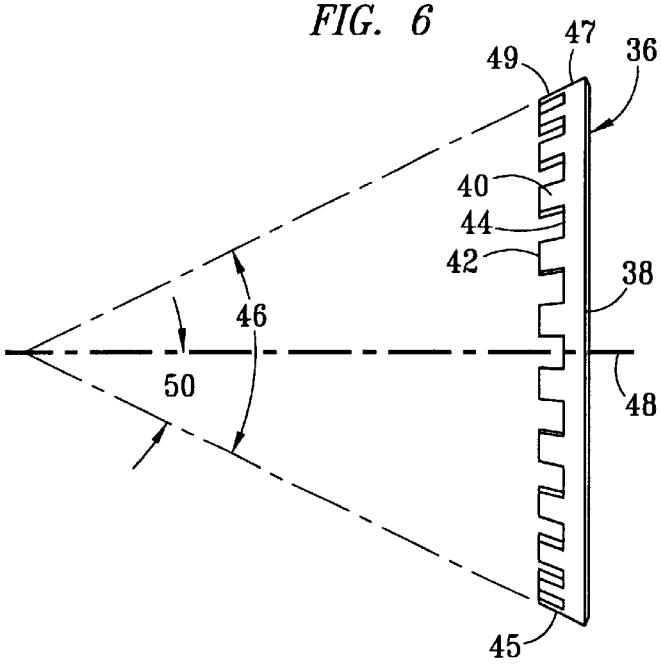
FIG. 7
FIG. 6

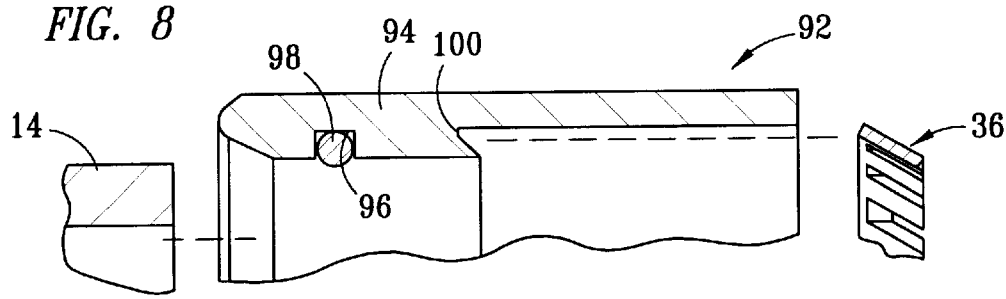
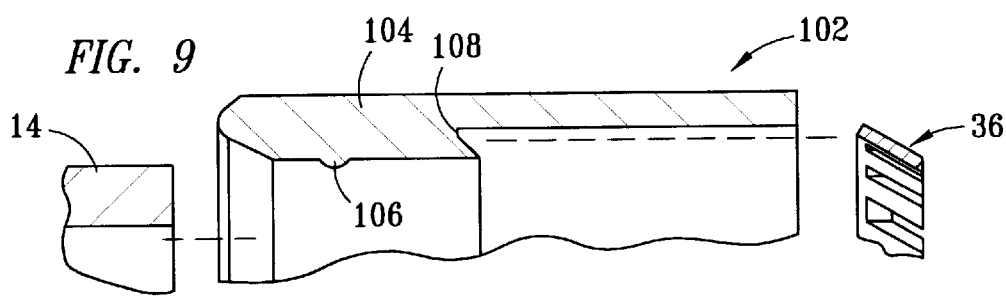
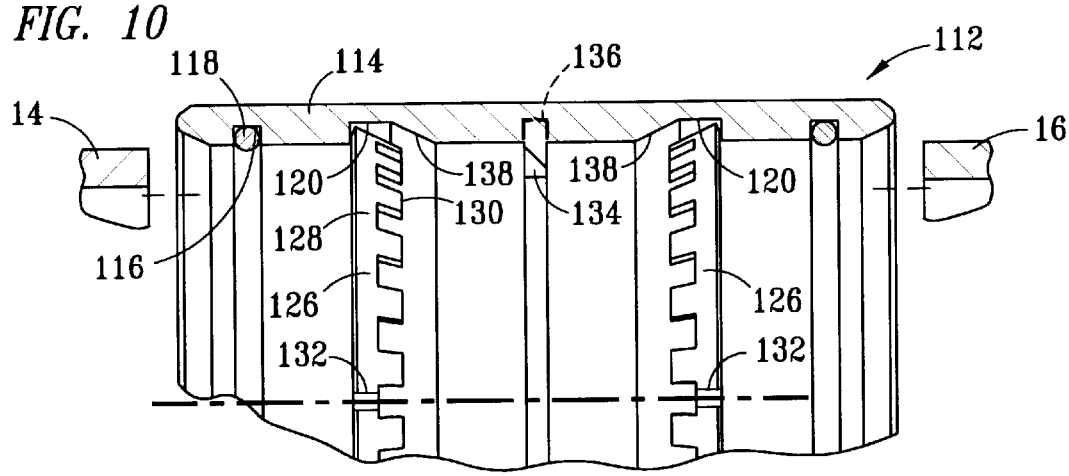
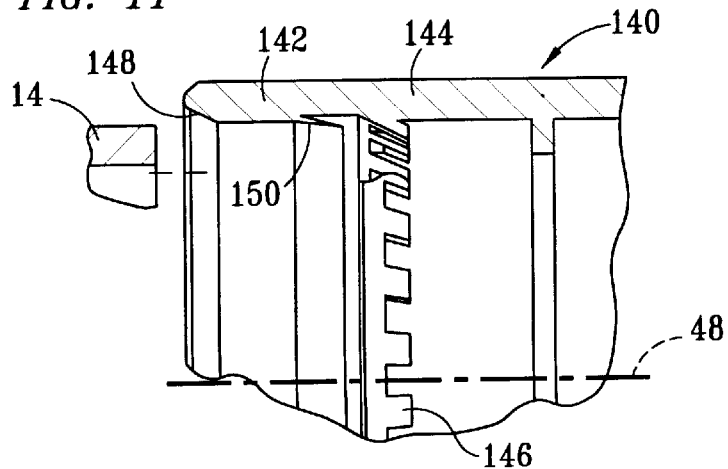

CONDUIT COUPLING WITH INTERIOR GRIP RINGS

CROSS-REFERENCE TO RELATED APPLICATIONS

The present invention is a continuation of and claims priority to U.S. Provisional Patent Application Serial No. 60/246,322, filed Nov. 6, 2000, entitled "Conduit Coupling With Interior Grip Rings," and invented by Lyall et al.

TECHNICAL FIELD OF THE INVENTION

The present invention relates in general to couplings for joining tubular conduits, and in particular to a grip coupling having an interior grip ring for securing tubular conduit to the grip coupling.

BACKGROUND OF THE INVENTION

Prior art connectors and fittings have been utilized for joining to tubular conduits for connecting the tubular conduits to other members. The tubular conduits have included electrical conduits, piping, ducting and the like, which have been used for both fluid flow conduits and to provide protective enclosures for electrical power and telecommunication cables. For power and telecommunication cable installations which are buried or located in hazardous environments, a fluid tight seal is provided between the fitting and the mating ends of the tubular conduits. Recently, tubular conduits made of polyethylene have been provided for running telecommunication cables, such as fiber optic cables. In the prior art, fittings typically have been joined to the terminal ends of sections of such tubular conduits by either adhesive bonding, swedging or securing two mating threads together. Securing a fitting to a conduit end requires preparation to clean the surfaces of the conduit end for bonding to an adhesive, which is labor intensive. Swedged fittings require that swedging members be placed on opposite sides of a terminal end section of a tubular conduit so that the end of the conduit may be squeezed between the two swedging members. One of the swedging members is placed on the interior of the tubular conduit which results in a restriction which is smaller than the interior diameter of the tubular conduit, rather than providing a full boar opening. It is also preferable in some circumstances that conduit couplings be of a slim-line, or smaller, outside diameter. Swedging may also cause problems with tubular conduits made of polyethylene since polyethylene is subject to creep under pressure, causing the polyethylene material to cold flow and weaken the grip of the swedging members upon the tubular conduit. A threaded connection requires the threading of either an interior surface or an exterior surface of the tubular conduit, which is both time consuming and labor intensive.

The prior art also includes grip couplings, that is, couplings which are self-gripping when secured to the ends of tubular conduits. One example is that shown is U.S. Pat. No. 6,059,321, entitled "GRIP COUPLING FOR JOINING CONDUIT," invented by Lucian H. Lyall, III, and issued on May 9, 2000 to Group Timberline, Inc. of Kingwood, Tex., Assignee of the present application. U.S. Pat. No. 6,059,321 discloses a grip coupling having interiorly threaded ends which define interiorly disposed thread crests that extend with edges for scoring the exterior periphery of the tubular conduit being joined, such that when the coupling is rotated, the threads will grippingly engage the tubular conduit and pull the tubular conduit further within the grip coupling to secure the tubular conduit within the grip coupling. Other self-gripping couplings for joining tubular conduit having included tabs, or barbs, which are formed in the interior of the couplings for cutting into the exterior periphery of conduit being joined therewith to secure the tubular conduit within the grip couplings. In the prior art, grip couplings are typically required to hold against minimum specified pull out forces in excess of five hundred pounds. Prior art tubular conduit couplings typically require greater force for securing such a coupling to a tubular conduit than the average person could reasonably exert without the aid of tooling for securing tubular conduit to couplings which can achieve pull out ratings in excess of five hundred pounds.

SUMMARY OF THE INVENTION

A grip coupling is provided for securing tubular conduit. The grip coupling has two coupling body halves which are joined along weld lines at a central portion of the grip coupling. Each of the coupling body halves has a tapered entrance section and an interior seal which is provided adjacent the tapered entrance section of the grip coupling, inboard of the tapered entrance section and preferably integrally formed with the body of the grip coupling. Two annular-shaped shoulders are formed in the interior surfaces of each of the coupling body halves, with the annular-shaped shoulders facing inboard relative to respective coupling body halves and being spaced apart when the two coupling body halves are joined together. Two grip rings are disposed within respective ones of the two coupling body halves, fitting against respective ones of the two annular-shaped shoulders. The grip rings each preferably have a continuous, annular shaped grip ring body, grip teeth which extend from the grip ring body, and a tapered exterior periphery which tapers inward in extending from the grip ring body to the grip teeth. The grip rings are installed in respective ones of the two coupling body halves, with a spacer ring disposed therebetween and the grip teeth disposed inboard of the grip ring body, and then the two coupling body halves are joined together. The spacer ring preferably has two interiorly disposed, tapered surfaces which taper radially inward within the spacer ring in an outboard direction relative to the grip coupling and which may seal the terminal end of a tubular conduit.

BRIEF DESCRIPTION OF THE DRAWINGS

For a more complete understanding of the present invention and the advantages thereof, reference is now made to the following description taken in conjunction with the accompanying Drawings in which:

FIG. 6 is a side view of a grip ring of the grip coupling;

FIG. 7 is a partial, exploded view of components of the grip coupling;

FIGS. 8 through 10 are partial, longitudinal sections views of various alternative embodiments of self-gripping conduit couplings having tapered grip rings; and FIG. 11 is a partial, longitudinal section view of an alternative embodiment of a self-gripping coupling having integrally molded grip teeth.

DETAILED DESCRIPTION OF THE INVENTION

Figure 1:
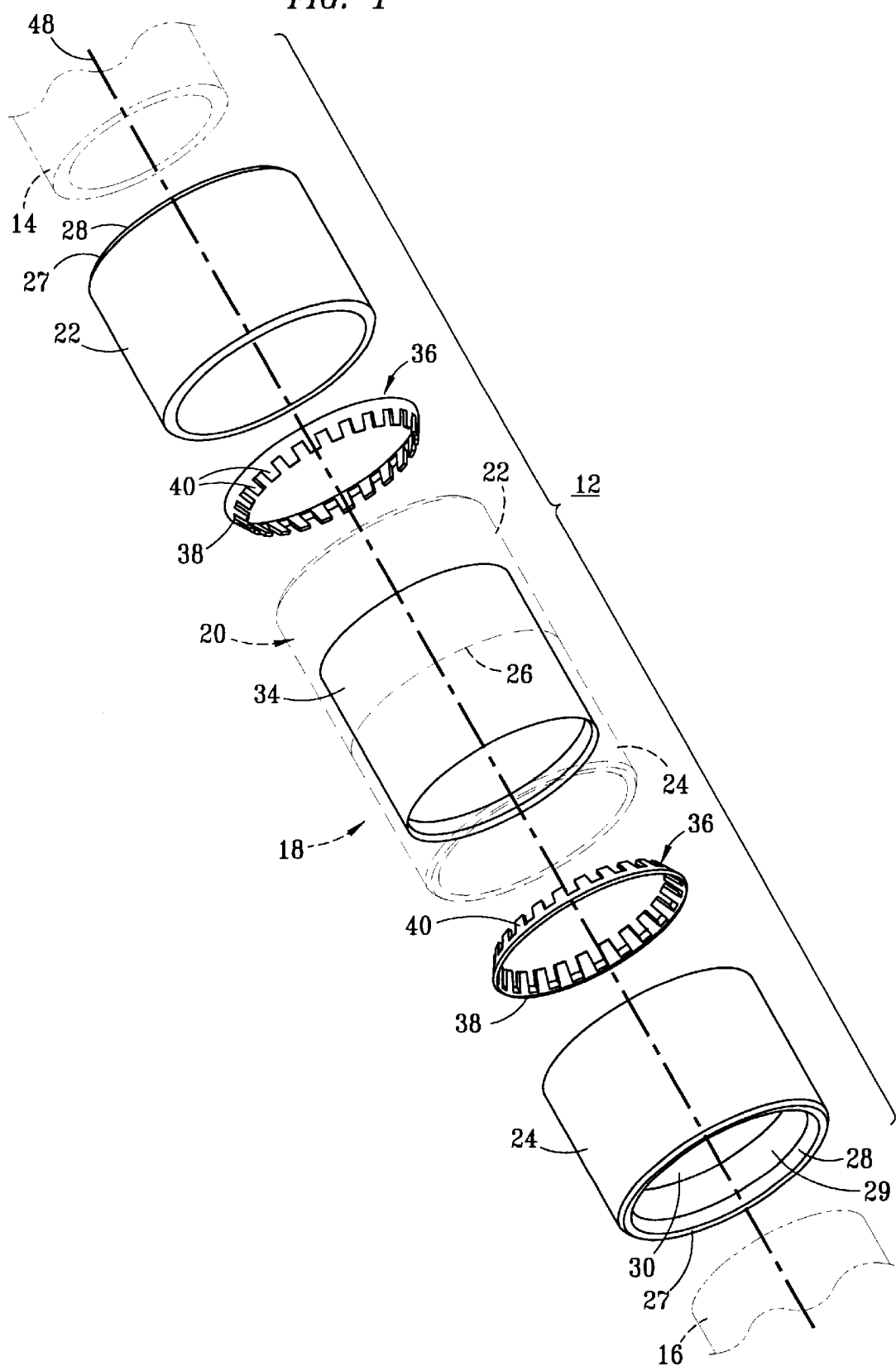
FIG. 1 is an exploded view, shown in perspective, of a grip coupling having internal grip rings.

FIG. 1 is an exploded view, shown in perspective, of a conduit 12 which includes two tubular conduit sections 14 and 16 (shown in phantom) which are joined together by a grip coupling 18. The grip coupling 18 has the coupling body 20 which is shown in phantom as an overlay to the exploded view, showing two tubular-shaped coupling body halves 22 and 24 which comprise the coupling body 20 after being joined together at a weld line 26. The two coupling body halves 22 and 24 are preferably joined together by either sonic welding or by friction welding, but which may also be joined by heat fusion, solvent cement, adhesives and the like, or other joining means. The two coupling halves 22 and 24 each have a tapered entrance sections 28 formed on their respective outboard ends 27. Two grip rings 36 are disposed within the interior of the coupling body 20, spaced apart by a spacer ring 34. The coupling body 20 is preferably molded from a thermoplastic, such as polyethylene, polypropylene, PVC, polyamide, or the like. The grip rings 36 are preferably formed of metal, such as a No. 316 Stainless Steel.

Figure 2:
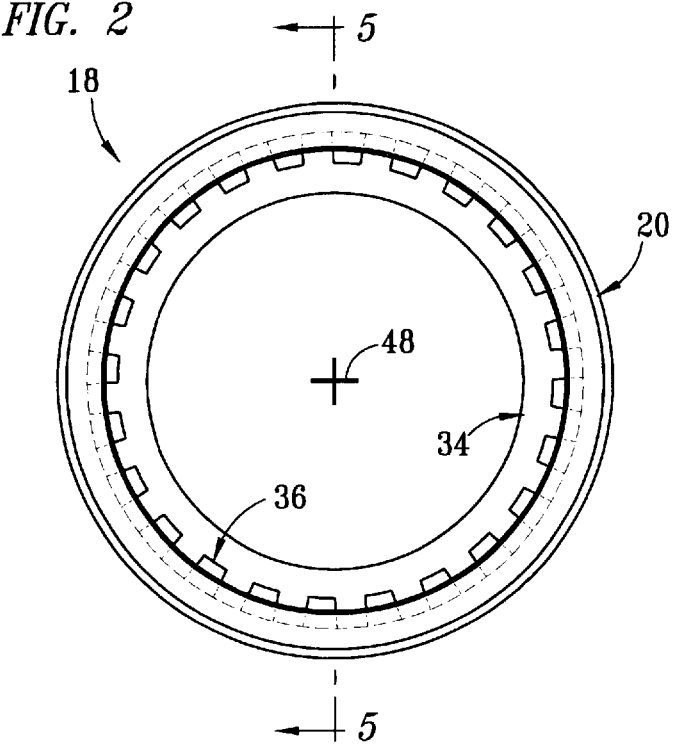
FIG. 2 is an end view of the grip coupling.

FIG. 2 is an end view of the grip coupling 18, showing the coupling body 20, the spacer ring 34 and one of the grip rings 36. The grip coupling 18 has a longitudinal axis 48. The grip coupling 18, the coupling body 20, the grip rings 36, the spacer rings 34 and the seal elements 72 are preferably coaxial with the central longitudinal axis 48 of the grip coupling 18.

Figure 3:
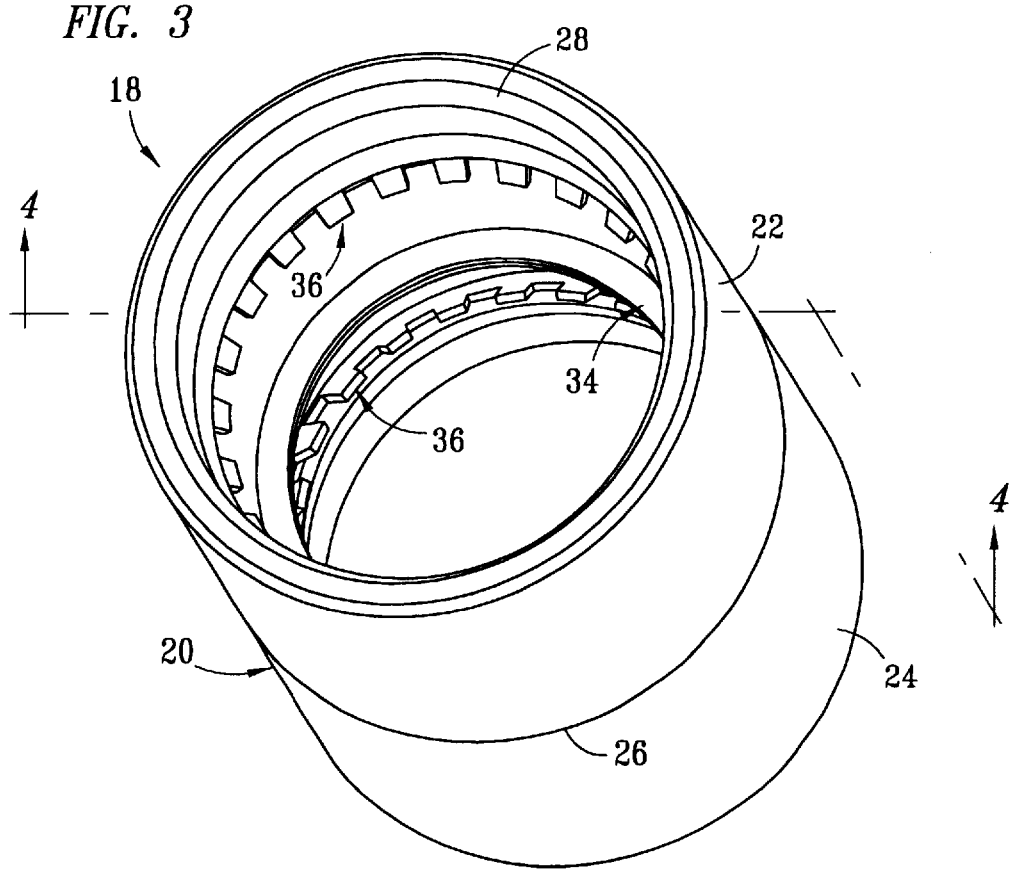
FIG. 3 is a perspective view of the grip coupling.

FIG. 3 is a perspective view of the grip coupling 18. The two coupling body halves 22 and 24 are shown joined together along the weld line 26, with the two grip rings 36 disposed interiorly within the coupling body 20 and spaced apart by the spacer ring 34.

Figure 4:
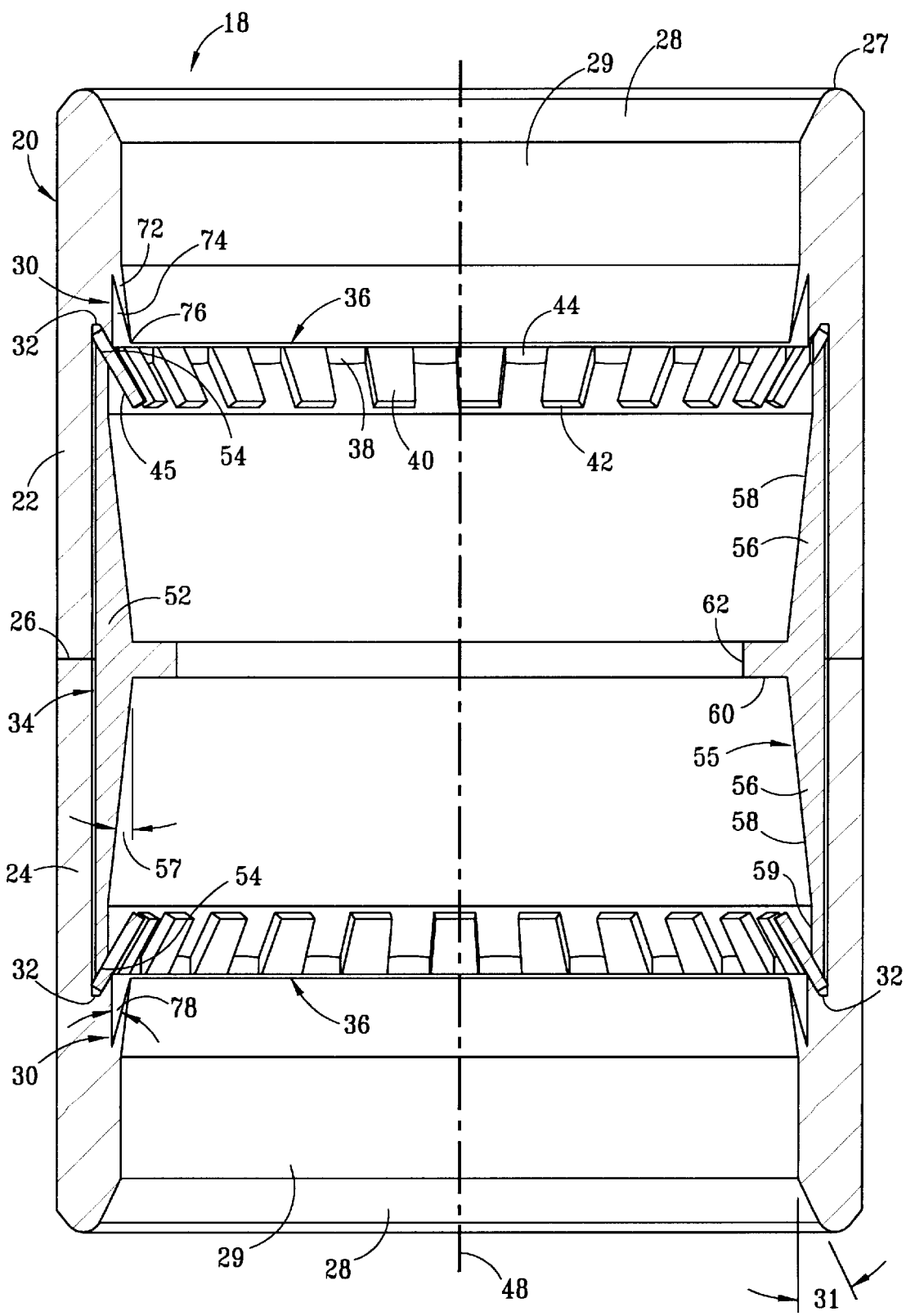
FIG. 4 is a longitudinal section view of the grip coupling, taken along section line 4—4 of FIG. 3.

FIG. 4 is a longitudinal section view of the grip coupling 18, taken along section line 4—4 of FIG. 3. The two coupling body halves 22 and 24 are joined together along the weld line 26, with the grip rings 36 disposed on opposite sides of the spacer ring 34. The outboard ends 27 of the coupling body halves 22 ad 24 are rounded and include the tapered entrance sections 28. Each of the coupling body halves 22 and 24 includes the tapered entrance section 28, a landing section 29 and a seal section 30, which has a seal element 72 which is preferably is integrally formed with the respective one of the coupling body halves 22 and 24. The seal elements 72 are considered integrally formed since they are formed as part of a singular bodies which comprise respective ones of the coupling body halves 22 and 24, without being separate members. The tapered entrance sections 28 have a taper angle 31 of preferably twenty-six degrees (26.0°), with respect to the longitudinal axis 48. The tapered entrance sections 28 both guide the tubular conduits 14 and 16 into the coupling body 18, and round the tubular conduits 14 and 16 should they be out of round for fitting within the coupling body 18, which is preferably cylindrical in shape. The landing sections 29 are disposed adjacent to the tapered entrance sections 28 and further round the conduits 14 and 16 for being in round to engage the seal elements 72. Each of the coupling body halves 22 and 24 also includes an inwardly disposed annular shoulder 32, which faces inboard for mating against a respective one of the grip rings 36. The grip rings 36 are frusto-conically shaped to taper inward in an inboard direction relative to the grip coupling body 20, and have the annular-shaped body 38, which is preferably continuous, and grip teeth 40, which are preferably square-shaped.

The spacer ring 34 has a body 52 with an exterior periphery of a generally cylindrical shape. The spacer ring 34 has opposite annular-shaped ends 54 which extend at a thirty degree (30.0°) angle to the longitudinal axis 48 for mating flush against the periphery 45 of the grip rings 36, preferably at the portion of the periphery 45 which is adjacent the annular-shaped body 38. The ends 54 provide shoulders for retaining the grip rings 36 against the shoulders 32 of the coupling body halves 22 and 24. The spacer ring 34 has an interior profile 55 which defines tapered sections 56. The tapered sections 56 extend with seal surfaces 58 which taper inward at an angle 57 of six degrees (6.0°) relative to the longitudinal axis 48, in an outboard direction relative to the coupling body (20), for being engaged by respective ones of the conduits 14 and 16 (shown in FIG. 5) in a preferably sealing engagement. The tapered sections 56 will round the conduit sections 14 and 16, such that portions of the conduits 14 and 16 which extend on opposite sides of the seal section 30 will be rounded. Other embodiments, the sections 56 may be formed without tapers, or with tapers such that they will not seal. An outer portion 59 of the interior profile 55 is substantially parallel to the longitudinal axis 48. The body 52 of the spacer ring 34 further includes an inwardly extending annular-shaped tab 60 which defines a stop for the terminal ends of the conduit sections 14 and 16. A hole 62 is defined by the interior surface of the annular-shaped tab 60 and provides a passage through the spacer ring 34.

The seal sections 30 of the coupling body halves 22 and 24 preferably each include the seal element 72 which is integrally formed with respective ones of the two coupling body halves 22 and 24. Preferably, the two coupling halves 22 and 24 are molded of thermoplastic with mold cores that defines an undercut region 74 and an end 76 of the seal element 72 which extends into the interior of a respective one of the coupling halves 22 and 24 at an acute angle 78, of seven degrees (7.0°), with respect to the longitudinal axis 48. The end 76 of the seal element 72 is preferably disposed inboard of the remainder of the seal element 72, and comes to a sharp, annular-shaped point.

Figure 5:
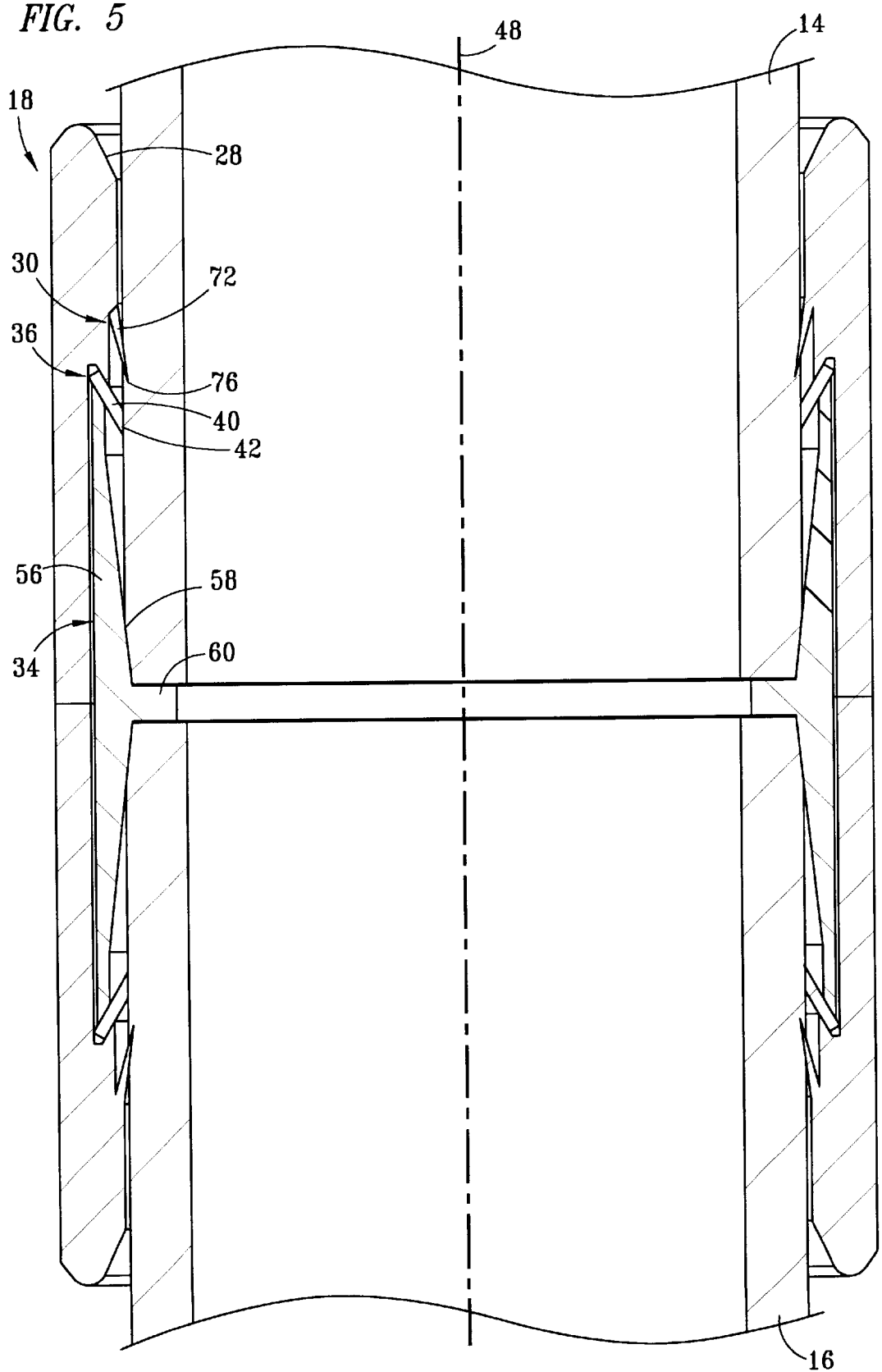
FIG. 5 is a partial longitudinal section view of the grip coupling joined to sections of tubular conduit, taken along section line 5—5 of FIG. 2.

FIG. 5 is a longitudinal section view of the grip coupling 18 after the two conduit sections 14 and 16 have been secured together with the grip coupling 18. The conduit sections 14 and 16 have been secured together with the grip coupling 18. The ends 76 of the seal elements 72 extend into the respective peripheries of the tubular conduit 14 and 16, preferably with interference fits of thirty-thousandths of an inch (0.030"). Crests 42 of the grip teeth 40 of the grip rings 36 grippingly engaging against the exterior peripheries of the conduit sections 14 and 16, preferably with an interference fit of thirty-thousandths to fifty-thousandths (0.030"to 0.050"). The terminal ends of the two conduit sections 14 and 16 are disposed adjacent to and fitting against opposite sides of the annular-shaped stop tab 60 of the spacer ring 34. The tapered seal surfaces 58 of the tapered sections 56 are also preferably engaged by the terminal ends of the conduit sections 14 and 16 with interference fits, such that the exterior periphery of the terminal ends of the conduit sections 14 and 16 are sealingly engaged by the tapered seal surfaces 58, with an interference fit therebetween. However, in some embodiments, the surfaces 58 may be of a constant diameter, rather than tapered.

FIG. 6 is a side view of the grip ring 36. The grip ring 36 has grip teeth 40 which protrude from one side of the annular-shaped-body 38 with crests 42 and roots 44. Preferably, the grip teeth 40 are square in shape. The annular-shaped body 38 of the grip ring 36 is preferably continuous, that is it does not have slot or is not a split-type ring. The exterior periphery 45 of the grip Ring 36 is of a frusto-conical shape, such that a first portion 47 of the periphery 45, which is adjacent to the annular body 38, and a second portion 49 of the periphery 45, which is adjacent the grip teeth 40, both taper inward, in an inboard direction relative to the coupling body 20 when installed within the grip coupling 18. The exterior periphery of the grip rings 36, preferably including both the annular-shaped body 38 and the grip teeth 40, has opposite sides which extend at an angle 46 to one another, which is preferably sixty degrees (60.0°), and at an angle 50 to the longitudinal axis 48, which is preferably thirty degrees (30.0°).

FIG. 7 is a partial, exploded view of the grip coupling 18 joining the conduit sections 14 and 16. The two coupling body halves 22 and 24 are first formed to have exterior peripheries which are preferably cylindrical in shape, and rounded, annular-shaped, outboard edges 27 which include tapered entrance sections 38. The interior of the two coupling body halves 22 and 24 are each molded to define profiles which include seal elements 72 which extend inward and in inboard directions relative to the two coupling body halves 22 and 24. Also, the inboard-facing shoulders 32 are formed into respective ones of the coupling body halves 22 and 24. The inboard shoulders 32 each have a flat edge 64, which extends preferably perpendicular to the longitudinal axis 48, and an inwardly tapered, in an inboard direction, surface 68 which extends at an angle of preferably thirty degrees to the longitudinal axis 48 to an annular-shaped terminal end point. The angle of the surface 68 extends at a taper for mating against and matching the tapered interior periphery of a respective one of the grip rings 36.

During assembly of the grip coupling 18, the grip rings 36 are inserted into respective ones of the two coupling body halves 22 and 24. The grip rings 36 are passed through the inboard ends of the two coupling body halves 22 and 24 with the grip rings 36 aligned to taper inward in an inboard direction, such that the grip teeth 40 are disposed on the inboard sides of respective ones of the two grip rings 36. The spacer ring 34 is inserted into the inboard ends of the two coupling body halves 22 and 24, with the two shoulders 54, which extend at an angle, mating flush against the exterior periphery of respective ones of the grip rings 36. The terminal, inboard ends of the two coupling body halves 22 and 24 are joined together, preferably by either friction welding, sonic welding, or heat fusion. Other methods of joining or coupling together the two coupling body halves 22 and 24 together may also be used.

The conduit sections 14 and 16 are pressed into the outboard ends 27 of the two coupling body halves 22 and 24, preferably until the terminal ends of the conduit sections 14 and 16 are mating flush against the annular-shaped stop 60 of the spacer ring 34, as shown in FIG. 5. As the ends of the two conduit sections 14 and 16 pass through the outboard ends 27 of respective ones of the two coupling body halves 22 and 24, they engage the tapered entrances 28 such that the ends of the two conduit sections 14 and 16 are both guided into the interior of the two coupling body halves 22 and 24, and the two conduit sections 14 and 16 are shaped to be more correctly round, such as for polyethylene conduits. The landing sections 29 will further round the tubular conduit sections 14 and 16 for being sealingly engaged by the seal element 72 of the seal section 30. Then, the seal element 72 and the grip teeth 40 will engage against the exterior peripheries of the conduit sections 14 and 16 to sealingly engage against and secure the conduit sections 14 and 16 within respective ones of the two coupling body halves 22 and 24. The tapered surfaces 58 of the taper sections 56 of the spacer ring 34 will preferably also sealingly engage against the respective terminal ends of the conduit sections 14 and 16.

FIG. 8 is a partial, longitudinal section view of an alternative grip coupling 92 having a coupling body 94 into which a groove 96 is formed to define a seal gland for receiving a seal element 98, such as an O ring seal and into which an inboard-facing shoulder 100 is formed for engaging a grip ring 36. A conduit section 14 is inserted through the outboard end of the alternative grip coupling 92. The seal element 98 will seal against the exterior periphery of the tubular conduit 14, and the grip ring 36 will secure the tubular conduit 14 within the grip coupling 92.

FIG. 9 is a partial, longitudinal section view of an alternative grip coupling 102, having a coupling body 104 into which a seal element is integrally formed as part of the coupling body 104. Also formed into the coupling body 104 is an inboard-facing shoulder 108 against which a grip ring 36 is engaged to secure the grip ring 36 within the coupling body 104. The tubular conduit 14 is pressed into the outboard end of the coupling body 104 of the grip coupling 102, and secured therein with the grip ring 36. The shoulder 108 retains the grip ring 36 within the coupling body 104 against pullout from the coupling body 104. The integrally formed seal element 108 will sealingly engage against the exterior periphery of the tubular conduit 14.

FIG. 10 is a partial, longitudinal section view of an alternative grip coupling 112 having a coupling body 114. Seal grooves 116 are formed into the interior surface of opposite ends of the coupling body 114 for receiving respective ones of two seal elements 118, which are preferably O rings. Two grip ring grooves 120 are formed into opposite ends of the interior of the grip coupling body 114, both inboard of respective ones of the two seal grooves 116. Two grip rings 126 are disposed in respective ones of the two grip ring grooves 120. The grip rings 126 have an annular-shaped body 128 and grip teeth 130 which extend inboard of the annular-shaped body 128. Preferably, the annular-shaped bodies 128 of the grip rings 126 are non-continuous, having respective splits 132 which extend through respective ones of the annular-shaped bodies 128, such that the grip rings 126 are collapsible for being installed through the outboard end of the coupling body 114 and into the grooves 120 formed into the interior of the coupling body 114. Annular-shaped relief tapers 138 are formed into interior of the coupling body 114 such that the teeth 130 may flex outward to receive the terminal ends of the tubular conduits 14 and 16. As shown, the coupling body 114 has an integrally molded stop 134, which is annular-shaped. Also shown in phantom is an alternative embodiment of the grip coupling 112, in which rather than the stop 134 being integrally molded with the interior of the coupling 114, a groove 136 (shown in phantom) may be formed into the interior surface of the coupling body 114 for receipt of an annular-shaped ring which provides the stop 134, which need not be in a continuous annular-shape but may instead have a gap such that it is collapsible.

FIG. 11 is a partial longitudinal section view of a grip coupling 140, having a coupling body 142 and a coupling body 144, which are joined to provide a coupling half. The grip coupling 140 includes grip teeth 146, with the grip teeth 146 being integrally formed with the coupling body 144. The grip teeth 146 define a grip section of the coupling body 144, and extend circumferentially around the central longitudinal axis 148 of the coupling body 144, and taper inward as they extend in an inboard direction relative to the coupling body 144. The coupling body 142 includes a tapered entrance section 148 and a seal section 150, with the tapered entrance section 148 disposed outboard of the seal section 150, and the seal section 150 disposed outboard of the grip teeth 146.

The present invention provides several advantages over prior art grip couplings for joining tubular conduits. The grip couplings of the present invention have interiorly disposed grip rings which are preferably formed of metal and which are tapered in an inward direction as they extend inboard of the grip coupling. A shoulder is formed into a body of the grip coupling to face inboard for securing the grip rings within the coupling body. Outboard of the grip rings, seals are provided for sealingly engaging against the tubular conduit sections being joined. The seals are disposed outboard of the grip rings, such that the grip rings will not score the exterior periphery of the tubular conduit sections and create leak paths which are adjacent to the seals. The interior of the outboard ends of the grip coupling have tapered surfaces for guiding the conduit sections being joined within the interior of the grip coupling, and also for rounding the shape of the ends of the conduit sections. Landings are also provided between the seals and the tapered entrance sections for further rounding the conduit sections for engaging the seals. In the preferred embodiment, the seal members are integrally formed with the grip coupling body, and preferably define lip-type seals, which are configured such that pressure within the interior of the conduit and the grip coupling will cause the integrally formed seal members to sealingly engage against the respective exterior peripheries of the conduit sections being joined. Preferably, undercut regions formed into the interior surfaces of the coupling body define the seal members and provide a mechanical advantage, such that the end tip of the seal member will engage against the exterior periphery of the tubular sections with a higher pressure than that of the internal pressure applied against the seal member by the undercut region which is exposed to the internal pressure. Additionally, a grip coupling having an interiorly disposed grip ring of conical shape and integrally formed seal member may be configured to provide a slim-line coupling, that is, one of a smaller exterior dimension, than a coupling requiring grooves to provide seal glands. The conical shape of the grip ring of the preferred embodiment is of greater strength if the grip ring were constructed of a planar shape, and in some embodiments, may be secured to tubular conduit by hand while holding against pullout forces of in excess of five hundred pounds.

It should be noted that various features of the above-described grip couplings may be combined to provide other embodiments which are contemplated in the present application. Additionally, the above-described grip couplings may have a coupling half which is included as part of a bulkhead fitting, or in combination with a fitting half of another type of fitting, such as a standard, threaded pipe fitting or a coupling secured by an adhesive. Other embodiments may also provide grip couplings without seal sections.

Although the preferred embodiment has been described in detail, it should be understood that various changes, substitutions and alterations can be made therein without departing from the spirit and scope of the invention as defined by the appended claims.

What is claimed is:

1. A grip coupling for securing to a section of tubular conduit, comprising in combination:
    a coupling body having a tapered entrance section, a seal section and an interior shoulder which faces inboard of said coupling body, wherein said seal section is disposed outboard of said interior shoulder and said tapered entrance section is disposed outboard of said seal section;
    a grip ring disposed inboard of said interior shoulder, said grip ring having an annular-shaped grip ring body and grip teeth which extend inboard of said grip ring body, at least one of said grip ring body and said grip teeth having an exterior periphery which tapers inward as said exterior periphery extends inboard of said coupling body;
    a spacer shoulder disposed inboard of said interior shoulder, spaced apart from said interior shoulder for receiving said annular-shaped grip ring body therebetween, such that said grip ring is retained within said coupling body;
    wherein said tapered entrance section, said seal section and said grip ring are together configured for receiving the section of tubular conduit, with said seal section and said grip ring engaging against an exterior periphery of said tubular conduit with interference fits; and
    wherein said spacer ring further comprises an interior surface which defines a tapered section which tapers inward in an outboard direction relative to said coupling body and engages against a terminal end portion of the exterior periphery of the section of tubular conduit with an interference fit.

2. The grip coupling according to claim 1, wherein said spacer ring further comprises an annular-shaped stop tab which extends within an interior of said spacer ring for engaging against a terminal end of the tubular conduit.

3. A grip coupling for securing to a section of tubular conduit, comprising in combination:
    a coupling body, having a tapered entrance section, a seal section and an interior shoulder which faces inboard of said coupling body, wherein said seal section is disposed outboard of said interior shoulder and said tapered entrance section is disposed outboard of said seal section;
    a grip ring disposed inboard of said interior shoulder, said grip ring having an annular-shaped grip ring body and grip teeth which extend inboard of said grip ring body, at least one of said grip ring body and said grip teeth having an exterior periphery which tapers inward as said exterior periphery extends inboard of said coupling body;
    a spacer shoulder disposed inboard of said interior shoulder, spaced apart from said interior shoulder for receiving said annular-shaped grip ring body therebetween, such that said grip ring is retained within said coupling body;
    wherein said tapered entrance section, said seal section and said grip ring are together configured for receiving the section of tubular conduit, with said seal section and said grip ring engaging against an exterior periphery of said tubular conduit with interference fits; and
    wherein said grip coupling body is comprised of two coupling body halves which are separately formed of thermoplastic and joined together to define said coupling body, with each of said two coupling body halves having said tapered entrance section, said seal section and said interior shoulder which are configured for receiving a grip ring and a respective ends of separate sections of the tubular conduit.

4. In a grip coupling for securing to a section of tubular conduit, said grip coupling having a coupling body with an entrance section and a grip region, wherein said entrance section is disposed outboard of said grip region, and wherein said entrance section and said grip region are together configured for receiving the section of tubular conduit, with said grip region engaging against an exterior periphery of said tubular conduit with an interference fit, and the improvement comprising:

a spacer ring which has an annular-shaped outboard end which defines a spacer shoulder, wherein said spacer ring is formed separately from said grip ring and said coupling body;

said spacer ring further comprises an interior surface which defines a tapered section which tapers inward in an outboard direction relative to said coupling body and engages against a terminal end portion of the exterior periphery of the section of tubular conduit with an interference fit;

said grip region having an interior shoulder which faces inboard of said coupling body, spaced apart from said spacer shoulder which is disposed inboard of said interior shoulder and faces outboard relative to said coupling body; and a grip ring disposed within said grip region, inboard of said interior shoulder and outboard of said spacer shoulder, said grip ring having an annular-shaped grip ring body and grip teeth which extend inboard of said grip ring body, at least one of said grip ring body and said grip teeth having an exterior periphery which tapers inward as said exterior periphery extends inboard of said coupling body.

5. The grip coupling according to claim 4, further comprising a seal section disposed intermediate between said entrance section and said grip section, and extending inward for engaging the section of tubular conduit with an interference fit.

6. The grip coupling according to claim 4, wherein said entrance section of said coupling body tapers to a smaller diameter in an inboard direction.

7. In a grip coupling for securing to a section of tubular conduit, said grip coupling having a coupling body with an entrance section and a grip region, wherein said entrance section is disposed outboard of said grip section, and said entrance section and said grip region are together configured for receiving the section of tubular conduit, with said grip region engaging against an exterior periphery of said tubular conduit with an interference fit, the improvement comprising:

said grip region having grip teeth which have outer peripheries which taper inward in an inboard direction relative to said coupling body;

a spacer ring which has an annular-shaped outboard end which defines a spacer shoulder, wherein said spacer ring is formed separately from said grip ring and said coupling body; and said spacer ring further comprises an interior surface which defines a tapered section which tapers inward in an outboard direction relative to said coupling body and engages against a terminal end portion of the exterior periphery of the section of tubular conduit with an interference fit.

8. The grip coupling according to claim 7, further comprising a seal section disposed intermediate between said entrance section and said grip section, and extending inward within said coupling body for engaging the section of tubular conduit with an interference fit.

9. The grip coupling according to claim 8, wherein said grip teeth are integrally formed with said coupling body, and said entrance section tapers inward in an inboard direction within said coupling body.

10. The grip coupling according to claim 9, wherein said grip region further includes a grip ring body which is integrally formed with said coupling body and said grip teeth, said grip ring body having a periphery which tapers inward in the inboard direction relative to said coupling body.

11. The grip coupling according to claim 7, wherein said entrance section of said coupling body tapers to a smaller diameter in an inboard direction.

12. A method for sealingly securing a grip coupling to a section of tubular conduit, comprising the steps of:

providing a coupling body having an entrance section, a seal section and an interior shoulder which faces inboard of the coupling body, wherein the seal section is disposed outboard of the interior shoulder and the entrance section is disposed outboard of the seal section;

providing a grip ring having an annular-shaped grip ring body and grip teeth, wherein at least one of the grip ring body and the grip teeth have an exterior periphery which tapers inward, with a first portion of the exterior periphery disposed adjacent to the grip teeth being smaller than a second portion of the exterior periphery disposed adjacent to the grip ring body;

further providing a spacer ring which having an annular-shaped outboard end which defines a spacer shoulder, with the spacer ring being formed separately from the grip ring and the coupling body;

disposing the grip ring inboard of the interior shoulder, such that the grip teeth extend inboard of the grip ring body, with the exterior periphery of the grip ring tapering inward as the exterior periphery extends inboard relative to the coupling body;

disposing the spacer ring and the spacer shoulder inboard of the interior shoulder, spaced apart from the interior shoulder for receiving the annular-shaped grip ring body there between;

inserting an end of the section of tubular conduit within the outboard end of the coupling body, and through the entrance section, the seal section and the grip teeth;

engaging the seal section against the section of tubular conduit with an interference fit;

engaging the grip ring against the section of tubular conduit with an interference fit, such that the grip teeth extend inboard and inward within the coupling body into the section of tubular conduit to grippingly engage the section of tubular conduit within the coupling body;

further providing the spacer ring with an interior surface which defines a tapered section which tapers inward in an outboard direction relative to the coupling body; and engaging a terminal end portion of the exterior periphery of the section of tubular conduit against tapered section of the interior surface of the spacer ring with an interference fit.

13. A method for sealingly securing a grip coupling to a section of tubular conduit, comprising the steps of:

providing a coupling body having an entrance section, a seal section and an interior shoulder which faces inboard of the coupling body, wherein the seal section is disposed outboard of the interior shoulder and the entrance section is disposed outboard of the seal section;

providing a grip ring having an annular-shaped grip ring body and grip teeth, wherein at least one of the grip ring body and the grip teeth have an exterior periphery which tapers inward, with a first portion of the exterior periphery disposed adjacent to the grip teeth being smaller than a second portion of the exterior periphery disposed adjacent to the grip ring body;

further providing a spacer ring which having an annular-shaped outboard end which defines a spacer shoulder, with the spacer ring being formed separately from the grip ring and the coupling body;

disposing the grip ring inboard of the interior shoulder, such that the grip teeth extend inboard of the grip ring body, with the exterior periphery of the grip ring tapering inward as the exterior periphery extends inboard relative to the coupling body;

disposing the spacer ring and the spacer shoulder inboard of the interior shoulder, spaced apart from the interior shoulder for receiving the annular-shaped grip ring body there between;

inserting an end of the section of tubular conduit within the outboard end of the coupling body, and through the entrance section, the seal section and the grip teeth;

engaging the seal section against the section of tubular conduit with an interference fit;

engaging the grip ring against the section of tubular conduit with an interference fit, such that the grip teeth extend inboard and inward within the coupling body into the section of tubular conduit to grippingly engage the section of tubular conduit within the coupling body; and providing a second coupling body having a second entrance section, a second seal section and a second interior shoulder which faces inboard of the second coupling body, wherein the second seal section is disposed outboard of the second interior shoulder and the second entrance section is disposed outboard of the second seal section;

providing a second grip ring having a second annular-shaped grip ring body and second grip teeth, wherein at least one of the second grip ring body and the second grip teeth have a second exterior periphery which tapers inward, with a first part of the second exterior periphery disposed adjacent to the second grip teeth being smaller than a second part of the second exterior periphery disposed adjacent to the second grip ring body;

further providing the spacer ring with a second annular-shaped outboard end which defines a second spacer shoulder;

disposing the second grip ring inboard of the second interior shoulder, such that the second grip teeth extend inboard of the second grip ring body, with the second exterior periphery of the second grip ring tapering inward as the second exterior periphery of the second grip ring extends inboard relative to the second coupling body;

disposing the spacer ring and the spacer shoulder inboard of the interior shoulder, spaced apart from the interior shoulder for receiving the annular-shaped grip ring body there between;

joining the inboard ends of the coupling body and the second coupling body, with the spacer ring extending interiorly there between, such that the entrance section of the coupling body is oppositely disposed from the second entrance section of the second coupling body;

inserting an end of a second the section of tubular conduit within the second outboard end of the second coupling body, and through the second entrance section, the second seal section and the second grip teeth;

engaging the second seal section against the second section of tubular conduit with an interference fit; and engaging the second grip ring against the second section of tubular conduit with an interference fit, such that the second grip teeth extend inboard and inward within the second coupling body into the second section of tubular conduit to grippingly engage the second section of tubular conduit within the second coupling body.

* * * * *